Jan. 7, 1969  W. P. KRAFT  3,420,493
COMBINATION METERING, CHECK AND SHUT-OFF VALVE
Filed Dec. 13, 1965

INVENTOR.
WILBUR P. KRAFT
BY HIS ATTORNEYS
HARRIS, KIECH, RUSSELL & KERN

United States Patent Office 3,420,493
Patented Jan. 7, 1969

3,420,493
COMBINATION METERING, CHECK AND
SHUT-OFF VALVE
Wilbur P. Kraft, 431 Lomitra St.,
El Segundo, Calif. 90245
Filed Dec. 13, 1965, Ser. No. 513,332
U.S. Cl. 251—82                    1 Claim
Int. Cl. F16k 15/18

ABSTRACT OF THE DISCLOSURE

A combination valve capable of metering flow in one direction, capable of acting as a check valve preventing flow in the opposite direction, and capable of being set in fully closed or fully open positions to prevent flow or to permit free flow, respectively.

Background of invention

In many piping installations, in addition to the usual flow control requirements, it is necessary or desirable to very accurately control the quantity of fluid flowing to a given component of the system while automatically preventing reverse flow or backflow of fluid from such component. In other instances, it may be desirable to control the quantity of fluid flowing to the component while automatically limiting the amount of backflow to a lesser quantity.

Accordingly, an object of this invention is to provide a unitary valve which will function both as a metering valve and as a check valve, and as a positive shut-off valve.

A primary object of this invention is to provide a unitary valve which opens and closes in response to predetermined ratios of the pressure of the fluid at the inlet to the pressure of the fluid at the outlet, the amount the valve opens being accurately controlled to thereby accurately meter the quantity of fluid allowed to flow through the valve.

More particularly, an object of this invention is to provide a unitary valve which will function as a metering valve when fluid flow is in one direction and as a check valve when the fluid flow is in the reverse direction.

A further object of this invention is to provide a unitary valve which will assume a fully open position when fluid flows through the valve in one direction and will partially close to reduce the quantity of fluid flowing therethrough when fluid is flowing in the opposite direction.

A further object of this invention is to provide a unitary valve which functions as a metering valve when fluid flow is in one direction and as a check valve when the fluid flow is in the reverse direction, the valve being mechanically openable to allow fluid flow therethrough in either direction.

Still another object of this invention is to provide a unitary metering and check valve which is openable in response to fluid pressure, the specific value of the opening pressure being readily adjustable.

Summary and objects of invention

Still another object of this invention is to provide a combination needle valve and check valve which is inexpensive, of simple construction, and prevents leakage even when used in high pressure systems.

Briefly stated, the objects of this invention may be accomplished by providing a housing having an inlet, an outlet, and a flow passageway connecting the inlet and the outlet, and a valve seat in the flow passageway; a shaft secured to the housing for movement relative thereto; a pressure-responsive valve element in the housing engageable with the valve seat to define a closed position of the valve element, the valve element being movable in the housing away from the valve seat to define a fully open position of the valve element; means securing the valve element to the shaft for movement therewith and for movement a limited distance relative thereto; and biasing means for urging the valve element toward the valve seat, the valve element being movable relative to the shaft against the force of the biasing means toward the fully open position in response to fluid flow from the inlet to the outlet.

The invention, both as to its organization and method of operation together with further objects and advantages thereof may best be understood by reference to the following description taken in connection with the accompanying drawing.

Detailed description of exemplary embodiment of invention

Figure 1:
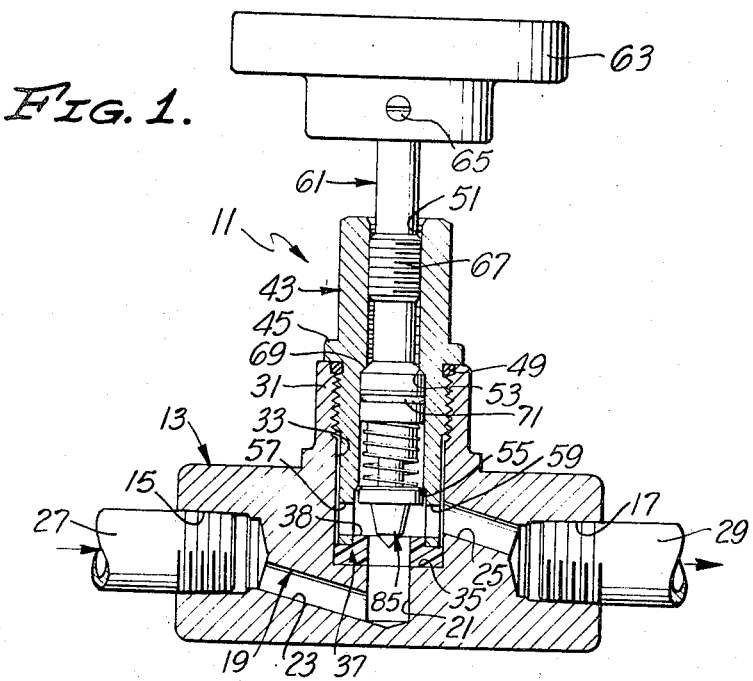
FIG. 1 is a vertical sectional view of a combination needle and check valve constructed in accordance with the teachings of this invention, the valve being shown in the mechanically fully open position.

Referring to the drawing, and in particular to FIG. 1 thereof, reference numeral 11 designates a valve constructed in accordance with the teachings of this invention. The valve 11 includes a housing 13, an inlet 15, an outlet 17, and a flow passageway 19 interconnecting the inlet and the outlet. The flow passageway 19 includes a generally vertical intermediate portion 21 and laterally extending portions 23 and 25 connecting the intermediate portion with the inlet 15 and the outlet 17, respectively. Preferably, the laterally extending portions 23 and 25 are of smaller diameter than the inlet 15 and the outlet 17 and are disaligned axially therefrom. Conduits 27 and 29 are threadedly received in the inlet 15 and the outlet 17, respectively, and serve to connect the valve 11 into a piping system (not shown).

An annular flange 31 extends upwardly from the housing 13. The housing 13 has a relatively large diameter cylindrical recess 33 coaxial with the intermediate portion 21 of the flow passageway 19 and communicating the latter with the exterior of the housing. Thus, the intermediate portion 21 is in communication with the conduit 29 through the lower portion of the recess 33 and the lateral extending portion 25. The recess 33 terminates in a flat shoulder 35 the plane of which is perpendicular to the axis of the recess.

An annular valve seat element 37 having a valve seat 38 and a central passageway 39 therethrough which forms an extension of the intermediate portion 21 is positioned on the shoulder 35. Although the valve seat element 37 may be integral with the housing 13, it is preferred to construct the valve seat element as a separate member. This allows the use of different materials for the housing 13 and the valve seat element 37. Preferably, the housing 13 is constructed of stainless steel and the valve seat element 37 may be constructed of nylon, Teflon, or Kel F. The valve seat element 37 has an annular notch 41 on the upper side thereof.

A sleeve 43 is threadedly received by the recess 33 and a peripheral flange 45 on the sleeve abuts the upper end of the annular flange 31 of the housing 13. The sleeve 43 has an inner end 47 which fits in the notch 41 of the valve seat 37 to clamp the latter tightly against the shoulder 35. An O-ring 49 seals the sleeve 43 in the recess 33.

The sleeve 43 has an axial opening 51 defining internal annular shoulders 53 and 55. A pair of aligned apertures 57 and 59 extend transversely through the sleeve 43 and the latter of these apertures communicates the recess 33 with the lateral extension 25.

A shaft 61 having a control knob 63 secured to the upper end thereof by a set screw 65 is mounted for axial movement within the opening 51. Preferably, the shaft 61, the opening 51, the central passageway 39, the recess 33, and the intermediate portion 21 are all coaxial. It is also preferred that the shaft 61 be mounted within the opening 51 by screw threads 67. Thus, by rotating the control knob 63 the shaft 61 is moved axially within the opening 51.

The shaft 61 has a frusto-conical peripheral abutment 69 formed intermediate its ends. The peripheral abutment 69 is engageable with the internal shoulder 53 on the sleeve 43 to define the outermost position of the shaft 61 and the mechanically fully open position. The shaft 61 is sealed within the opening 51 by an O-ring 71 and a washer 73. The shaft 61 has an inner end or abutment 75, an axially extending cavity 77 opening at the inner end 75, and an annular peripheral ledge 79. Transversely aligned bores 81 and 83 are in communication with the cavity 77 and the exterior of the shaft 61.

A valve element 85 is mounted on the lower end of the shaft 61 for limited axial movement relative thereto. The valve element 85 includes a valve head 87 engageable with the valve seat 38, and a stem 89 slidably disposed in the cavity 77. A slot 91 extends transversely through the stem 89 and a pin or abutment 93 in the bores 81 and 83 extends through the slot to mount the valve element 85 for limited axial movement relative to the shaft 61. Bleed passages 95 within the valve stem 89 are in communication with the cavity 77 and the recess 33 to prevent a dashpot effect as the valve element moves axially relative to the shaft 61.

The valve head 87 has a surface 97 which extends into the central passageway 39 in the valve seat 37 (FIG. 3) when the valve element 85 is in the closed position, and an annular seat-engaging surface 99 engaging the valve seat 38 in the closed position to block the flow passageway 19. The valve head 87 also has an outer face 101 which is engageable with the abutment 75 on the shaft 61. A coil spring 103 engages the ledge 79 of the shaft 71 and the outer face 101 of the valve element 85 to urge the latter downwardly into fluid-tight sealing engagement with the valve seat 37.

A valve constructed in accordance with the teachings of this invention is quite versatile and can accomplish numerous flow control functions. First, the valve element 85 may be locked in the closed position by rotating the shaft 61 inwardly until the abutment 75 acts on the outer face 101 to clamp the surface 99 of the valve element tightly against the valve seat 38. In this position, the valve element 85 tightly engages the valve seat 38 to prevent leakage through the valve.

Secondly, the valve may be mechanically moved to the fully open position illustrated in FIG. 1 in which fluid may flow through the valve in either direction. In the mechanically fully open position flow through the valve can be at a substantially maximum rate in either direction. In the mechanically fully open position, the abutment 69 on the shaft 61 is in engagement with the shoulder 53 and the spring 103 urges the stem 89 of the valve element 85 downwardly into engagement with the pin 93. Thus, the pin 93 forms an abutment which permits holding of the valve element 85 in the mechanically fully open position. If desired, the annular shoulder 55 may have a sufficiently small inside diameter so that the face 101 will abut thereagainst to prevent passage of the valve element 85 therethrough. Otherwise, when flow is in the direction indicated by the arrows in FIG. 2, the fluid under pressure might urge the valve element 85 against the biasing force of the spring 103 upwardly beyond the shoulder 55.

Figure 2:
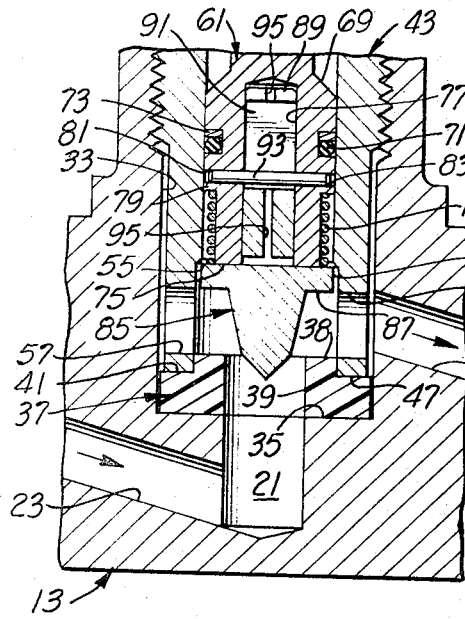
FIG. 2 is an enlarged, fragmentary, vertical, sectional view of the portion of the valve adjacent the valve element and valve seat, with the valve element being held in the fully open position by fluid pressure.
Figure 3:
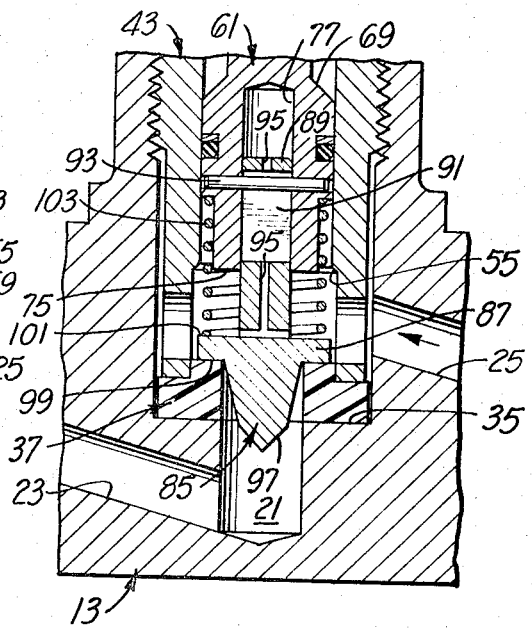
FIG. 3 is an enlarged, fragmentary, vertical, sectional view similar to FIG. 2 with the valve being shown in the closed position.

When the shaft 61 is turned to the position shown in FIGS. 2 and 3, the valve functions as a check valve or as a flow control valve depending upon the pressure of the fluid in the flow passageway 23. Assuming that there is no fluid pressure in either of the conduits 27 or 29, the spring 103 urges the valve element 85 into fluid-tight sealing engagement with the valve seat 38 as shown in FIG. 3. By varying the axial position of the shaft 61 relative to the valve element 85, the force of the spring 103 acting on the valve element may be adjusted so that a greater or lesser fluid pressure will be required to open the valve. The valve element 85 will remain in the position illustrated in FIG. 3 until the force of the fluid in the intermediate portion 21 acting on the surface 97 of the valve element 85 is sufficient to overcome the force of any fluid acting on the outer face 101 and the force of the spring 103. When this occurs, the valve element 85 is forced by the fluid under pressure from the intermediate portion 21 to the position shown in FIG. 2 to allow fluid to flow through the valve from the conduit 27 to the conduit 29. Once the valve element 85 has moved slightly off the valve seat 38, the fluid can act on the surface 99 thereby placing a greater force on the valve element and causing the latter to move rapidly away from the valve seat and into engagement with the abutment 75. By turning the shaft 61, the abutment 75 can be moved closer to or further from the valve seat 38 to thereby accurately control the amount the valve element 85 is permitted to open in response to fluid under pressure from the intermediate portion 21.

Still another capability of the valve is to provide for maximum flow from the conduit 27 to the conduit 29 and an automatically reduced flow in the reverse diretcion. This can be accomplished by moving the shaft 61 and hence the valve element 85 away from the position shown in FIG. 1 toward the valve seat 38 but stopping the valve element before it engages the valve seat. In this position, the valve element 85 may be said to be in the mechanically partially open position. If fluid flows through the valve from the conduit 27 to the conduit 29, the pressure thereof will urge the valve element 85 from the mechanically partially open position to the fully open position. However, when fluid flows in the opposite direction, the force thereof and the force of the spring 103 urge the valve element 85 back to the mechanically partially open position in which only a limited amount of fluid can pass through the valve. Of course, the amount of reverse flow can be regulated by turning the shaft 61.

The stem 89 slides freely within the cavity 77 and the bleed passages 95 prevent a dashpot effect which would retard movement of the valve element. When the force of the fluid from the conduit 27 has increased or back pressure in the conduit 29 increases sufficiently, the valve element 85 is returned to the closed position.

Thus, by turning the shaft 61, the position of the abutments 75 and 93 are adjusted and the amount that the valve element 85 is permitted to move toward or away from the valve seat 37 is accurately controlled. The adjustable abutment 75 may also be used to lock the valve element 85 in the closed position. The valve element 85 is caused to open or close the flow passageway 19 in response to predetermined fluid pressure ratios. Thus, the valve of the present invention functions as both a needle valve and a check valve.

Many changes, modifications, and substitutions may be made by one having ordinary skill in the art without necessarily departing from the spirit and scope of this invention.

I claim as my invention:
1. A combination metering, check and shut-off valve, including:
    (a) a housing having an inlet, an outlet and a flow passageway connecting said outlet to said inlet;
    (b) said housing being provided with a valve seat therein which encircles said flow passageway between said inlet and said outlet and which faces downstream of said flow passageway toward said outlet;
    (c) an actuating shaft coaxial with said valve seat and threadedly connected to said housing for movement toward and away from said valve seat along the common axis of said actuating shaft and said valve seat, between fully closed and fully open positions, in response to rotation of said actuating shaft relative to said housing in opposite directions;
    (d) a pressure-responsive valve element in said housing and coaxial with said valve seat and said actuating shaft and having oppositely facing, axially spaced surfaces respectively exposed to fluid pressures in said flow passageway on opposite sides of said valve seat;
    (e) a limited-lost-motion connection between said valve element and said actuating shaft providing for floating movement of said valve element toward and away from said valve seat along said common axis, in response to variations in the pressures acting on said axially spaced surfaces, when said actuating shaft is in positions intermediate said fully closed and fully open positions thereof;
    (f) spring means interconnecting said actuating shaft and said valve element for biasing said valve element toward said valve seat;
    (g) said limited-lost-motion connection including interengageable abutment means on said actuating shaft and said valve element for maintaining said valve element in engagement with said valve seat when said actuating shaft is in said fully closed position; and
    (h) said limited-lost-motion connection including interengageable abutment means on said actuating shaft and said valve element for maintaining said valve element out of engagement with said valve seat when said actuating shaft is in said fully open position.

References Cited

UNITED STATES PATENTS

| 1,101,933 | 6/1914 | Hough | 251—276 |
| 2,081,938 | 6/1937 | Leonard | 251—276 |
| 2,274,876 | 3/1942 | Trott | 251—264 X |
| 3,097,660 | 7/1963 | Priesmeyer | 251—276 X |
| 3,184,214 | 5/1965 | King | 74—89.15 X |
| 1,541,757 | 6/1925 | Allen | 251—276 |

ALAN COHAN, *Primary Examiner.*

DAVID R. MATTHEWS, *Assistant Examiner.*

U.S. Cl. X.R.

137—329.3, 543.15; 251—276, 285